Feb. 21, 1967 P. C. GUNN 3,305,264
ADJUSTABLE AIRCRAFT SEAT
Filed Jan. 17, 1966
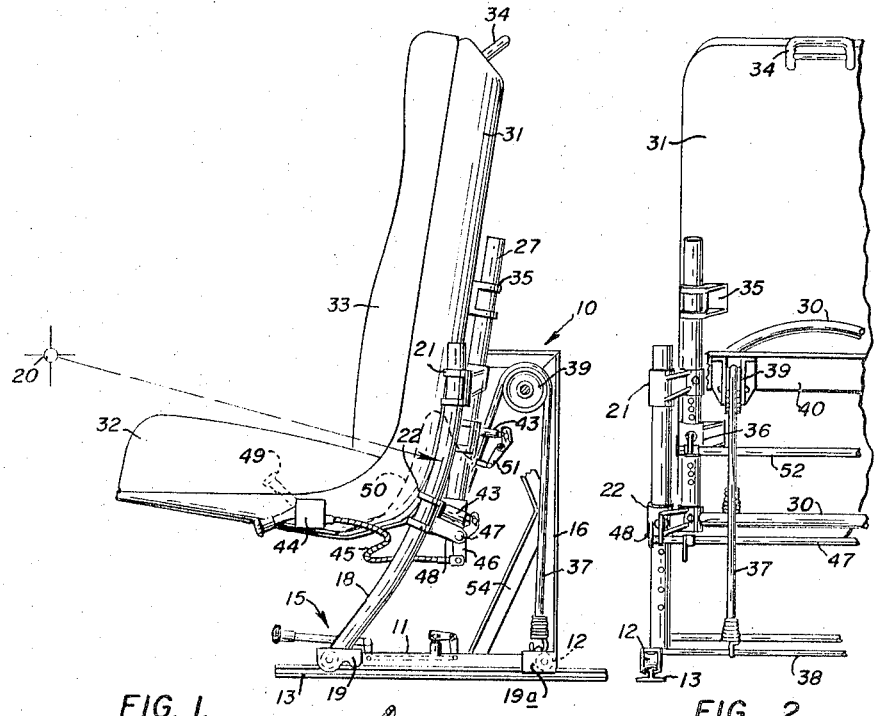
FIG. 1.
FIG. 2.
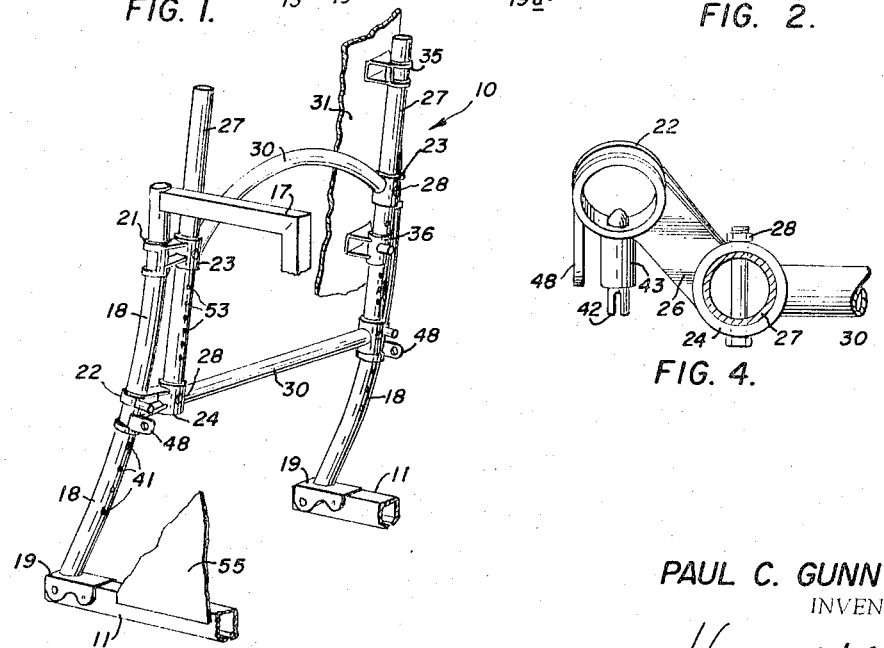
FIG. 3.
FIG. 4.
PAUL C. GUNN
INVENTOR.
BY *Herbert J. Brown*
ATTORNEY 3,305,264
ADJUSTABLE AIRCRAFT SEAT
Paul C. Gunn, Fort Worth, Tex., assignor to M. H. Spinks Sr. Enterprises, Inc., Fort Worth, Tex., a corporation of Texas
Filed Jan. 17, 1966, Ser. No. 521,052
1 Claim. (Cl. 297—346)

This invention relates to seats for aircraft and has particular reference to seats for pilots.

In addition to adjusting the height of seats of the described class, it is also desirable to adjust the forward and aft inclination of such seats. Heretofore, this was accomplished by complicated mechanisms involving numerous hinge bolts, hinged plates and hinged frame members which became loose over a period of time by reason of vibration of the aircraft in which they were installed.

An object of the invention is to provide a light weight yet strong aircraft seat capable of adjustment both as to height and forward and aft inclination.

A particular object is to provide adjustment of inclination on a radius about a point forwardly of the seat and whereby the handling of the aircraft controls, which are of a fixed height, remains relatively the same with reference to the pilot's body.

A further object is to provide means accomplishing the foregoing objects in a manner whereby the pilot may keep one hand on the controls of the aircraft at all times.

These and other objects of the invention will become apparent from the following description and the accompanying drawing, in which:

FIGURE 1 is a side elevational view of an aircraft seat according to the invention.

FIGURE 2 is a fragmentary rear elevational view of approximately one-half of the seat illustrated in FIGURE 1.

FIGURE 3 is a fragmentary perspective view of the forward portion of the seat frame and showing the slidable elements for adjusting the seat, both as to height and inclination, and FIGURE 4 is an enlarged broken plan view of the lower cross member of the frame and showing one of the slidable sleeves and stop means connected therewith.

In the drawing, there is a frame 10 having inverted generally channel shaped lower side members 11 with rollers 12 therein for contact with the upper surfaces of parallel tracks 13. On one of the side members 11 there is a lever mechanism 15 for adjusting the frame 10 fore and aft. Such mechanism is well known to the art and since the same does not comprise a part of the present invention it is not herein described in detail.

Extending upwardly from the rear of each lower side member 11 there is a vertical frame member 16 having a horizontal portion 17 for connection with the upper end of an arcuate forward frame member 18. The lower end of each forward frame member 18 is connected with the forward end of its corresponding horizontal side member 11 by a bracket 19. Similar brackets 19a secure the lower ends of the vertical members 16 to the lower side members 11.

The forward frame members 18 are preferably of tubular construction and are arced on a radius generated from a transverse line 20 forwardly of the seat to be described. A dashed arrow in FIGURE 1 defines the radius. The line 20 is in the vicinity of the hand operated aircraft control, not shown.

Slidably mounted on the arcuate forward frame members 18 there are upper and lower sleeves 21 and 22 which support generally parallel inwardly disposed upper and lower collars 23, 24 by means of integral arms 25, 26. Rigidly supported in the collars 23, 24 there are vertically extending straight seat supporting members 27. Preferably, the seat supporting members are detachably secured in their collars by bolts 28. The pairs of collars 23, 24 are, respectively connected by upper and lower cross members 30.

The seat is comprised of a metal bucket 31 of conventional construction and has the usual seat cushion 32 and back cushion 33 as well as a shoulder harness bracket 34 on top of the bucket. On the back of the bucket 31, and above and below the upper collars 23, there are upper and lower bucket sleeves 35 and 36 which are slidably mounted on the seat supporting members 27. A pair of elastic cables 37 are connected at corresponding ends with a cross member 38 between the lower ends of the vertical frame members 16 and extend over sheaves 39 mounted on an upper cross member 40 of the frame 10. The remaining ends of the cables 37 are connected with the lower area of the bucket 31 by brackets, not shown.

Along the back surfaces of the arcuate frame members 18 there are holes 41 for receiving the ends of locating pins 42 which are slidably mounted in tubular guides 43 on the back areas of the lower sleeves 22. The pins 42 are operated by a lever mechanism 44 on the left or near side of the seat portion of the bucket 31 by way of a flexible control cable 45 which is connected with a bell crank 46. The bell crank 46 is rigidly mounted on a shaft 47 journaled in brackets 48 integral with the lower sleeves 24. The bell crank 46 is connected with and operates one of the pins 42, whereas the shaft 47 turns another crank, not shown, which operates the other pin 42.

Shown only by dotted lines in FIGURE 1, there is another lever mechanism 49 and flexible control cable 50 on the far side of the seat portion of the bucket 31, and which cable extends to a bell crank 51 rigidly mounted on a transverse shaft 52 journaled in brackets, not shown, on the lower bucket sleeves 36. The bell crank 51 and another crank, not shown, operate stop pins, such as 42, in guides 43 on the back portions on the lower bucket sleeves 36, substantially as described in connection with FIGURE 4. The ends of the pins 42 engage any of a series of in line holes 53 in the backs of seat supporting members 27.

Other details shown in the drawing include diagonal braces 54 between the upper surfaces of the side members 11 and the vertical members 16 of the frame 10, FIGURE 1, and side panels 55 extending upwardly from the outer surfaces of the side members 11, FIGURE 3.

In operation, to tilt the seat the pins 42 are retracted from the holes 41 in the backs of the arcuate members 18 by operating the first described lever mechanism 44. At the same time, the occupant of the seat places his feet on the floor of the aircraft and by shifting his weight, tilts the seat to the desired position. Similarly, to raise or lower the seat, the other lever mechanism 49 is operated and the desired height is attained by the occupant by raising or lowering his body while in a sitting position.

The invention is not limited to the examplary construction herein shown and described, but may be made in various ways within the scope of the appended claim.

What is claimed is:

In an aircraft seat having a rigid back portion, a frame rearwardly of said back portion and including arcuate forward frame members, the radii of the arcs of said forward frame members being defined by a transverse line forwardly of said seat, upper and lower sleeves spaced apart and slidably mounted on said forward frame members, cross members connecting said upper and lower sleeves, straight generally vertical seat supporting members secured to said upper and lower sleeves, upper and lower seat supporting sleeves mounted on said seat and slidably mounted on said seat supporting members, spring means normally urging said seat upwardly, latch means selectively positioning the first said sleeves on said arcuate forward frame members, and latch means selectively positioning said seat supporting sleeves on said seat supporting members.

References Cited by the Examiner

UNITED STATES PATENTS

| | | | |
|---|---|---|---|
| 1,816,219 | 7/1931 | Hicks | 244—122 |
| 2,331,990 | 10/1943 | McArthur | 248—423 |
| 2,485,111 | 10/1949 | Robins | 297—346 |
| 2,611,420 | 9/1952 | Diehl | 297—346 |
| 2,655,981 | 10/1953 | Whittingham et al. | 297—345 |
| 2,659,413 | 11/1953 | Cramer | 248—408 |
| 2,669,284 | 2/1954 | Dall et al. | 297—346 |

FRANK B. SHERRY, *Primary Examiner.*

F. K. ZUGEL, *Assistant Examiner.*